H. B. McCABE.
TIME RECORDING REGISTER.
APPLICATION FILED OCT. 24, 1907.

946,858.

Patented Jan. 18, 1910.

WITNESSES:

INVENTOR
H. B. McCabe
BY
ATTORNEYS.

H. B. McCABE.
TIME RECORDING REGISTER.
APPLICATION FILED OCT. 24, 1907.

946,858.

Patented Jan. 18, 1910.

WITNESSES:
N. L. Sprinkle
M. W. Cantwell

INVENTOR
H. B. McCabe
BY
Brown & Hopkins
ATTORNEYS

UNITED STATES PATENT OFFICE.

HORACE B. McCABE, OF CHICAGO, ILLINOIS, ASSIGNOR OF ONE-HALF TO WILLIAM LLEWELLYN MILLER, OF MADISON, WISCONSIN.

TIME-RECORDING REGISTER.

946,858.      Specification of Letters Patent.      Patented Jan. 18, 1910.

Application filed October 24, 1907. Serial No. 398,868.

*To all whom it may concern:*

Be it known that I, HORACE B. MCCABE, a citizen of the United States, residing at Chicago, in the county of Cook and State of Illinois, have invented certain new and useful Improvements in Time-Recording Registers, of which the following is a full, clear, and exact specification.

The invention relates to that class of recording registers or stamps in which the recording type changes periodically, being electrically controlled by a master clock having suitable contacts for closing and opening the circuit, and adapted to be used for recording definite periods of time consumed by workmen on jobs in manufacturing establishments, thereby facilitating the determining of the cost of such labor.

The primary object of the invention is to provide an improved mechanism which a workman may operate on beginning a certain job and thereby print a number on a card, and when operated again on completing the job, or upon cessation of work on a job (which may be on the day of beginning, or at any time thereafter) will print another number on the card whereby the determining of the difference between the numbers will indicate the number of definite equal periods of time the workman has spent on the job.

A further object of the invention is to provide an improved device of the character described that is simple and efficient, that a workman may operate himself with the minimum amount of given instructions, and that will automatically stamp the time record on the card without any attention from the workman other than that required to insert the card and to set the mechanism in motion.

A further object of the invention is to provide an improved recording means adapted to be electrically operated from a master clock.

A further object of the invention is to provide an improved means in a device of the character described for shifting the position of the card or other object on which the time record is printed in relation to the recording mechanism.

A further object of the invention is to provide improved means in a device of the character described by which the time recording mechanism is locked against a shift or change from the time that the record indicating the time of stopping a job is printed until a second card of the same workman is printed, indicating the time of beginning a new job.

To the attainment of these ends and the accomplishment of other new and useful objects, as will appear, the invention consists in the features of novelty in the construction, combination and arrangment of the several parts hereinafter more fully described and claimed and shown in the accompanying drawings illustrating an exemplification of this invention, and in which:

Figure 1:
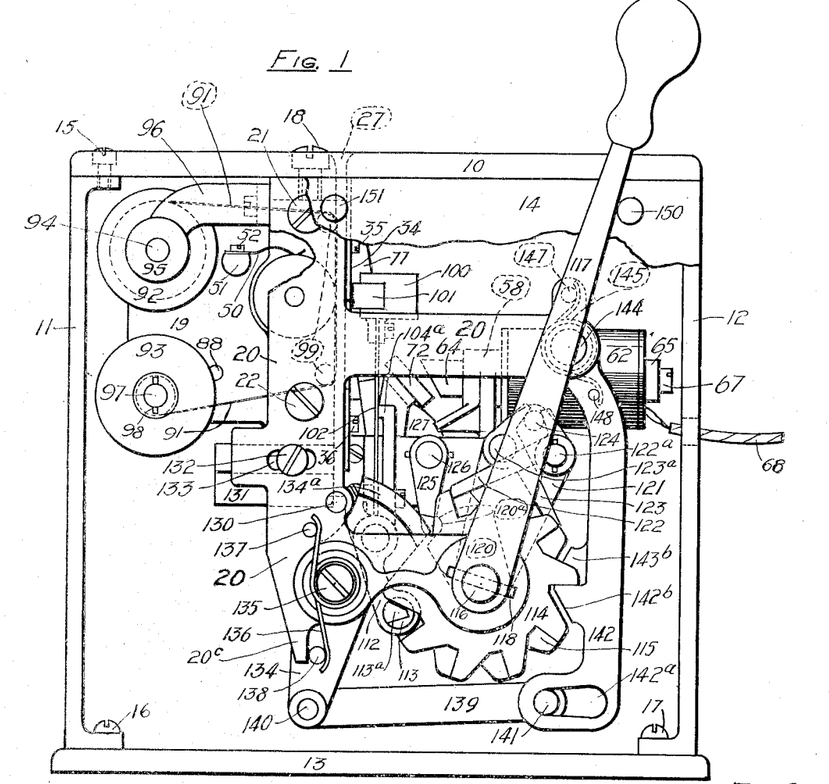
Figure 1 is a side elevation of the device with the walls of the casing inclosing the same broken away in order to disclose the interior mechanism.

On account of the construction of the mechanism required to produce the described results, it is preferred that the frame member or members to which the mechanism is secured shall be securely attached to a top plate as indicated by the numeral 10, Fig. 1, although it will be apparent that the construction of the main frame may be varied so that it may be attached to the interior of the casing in any desired manner. In the present embodiment of the invention, the plate 10 forms the top member of the casing, which is designed to inclose all of the mechanism of the device except the operating handle and the means shown for adjusting the ribbon. By this construction, the mechanism, which consists of numerous parts that require a certain degree of careful adjustment in order to operate satisfactorily, are protected. The top plate 10 is supported by uprights 11, 12, secured at the bottom to plate 13. The uprights 11, 12, may simply be supporting members around which a suitable casing or shell of sheet metal, the broken portion of which is illustrated at 14, may be employed to complete the closure. 15, 16 and 17 are screws used in securing the members of the casing together. 18 is a screw in the top plate extending through into the main frame of the mechanism by which the same is secured to the top plate of the casing, as already described, as many of such screws being employed as desired. On account of the numerous parts required in the organized mechanism, the main supporting frame must necessarily be of a more or less irregular shape. The preferred form of constructing the same is to divide it into two integral parts, as illustrated, these parts being indicated by the numerals 19 and 20. In Fig. 4 the parts carried on section 20 of the main frame are shown, and likewise in Fig. 6 the parts carried by the member 19 may be seen. The section 19 of the frame and its associated mechanism preferably receives the threaded ends of the screws 18 by which the mechanism is secured to the top plate 10, as seen in Fig. 1, these screws entering the top of the member as indicated by the screw threaded holes 19ª shown in Fig. 3. The frame member 20 is preferably secured to the member 19 as by the cap screws 21, 22 (see Figs. 1 and 3). The screws 21, 22 pass through holes 23, 24 in the upright branch of frame member 20 and the corresponding screw threaded holes 25, 26 of the frame member 19.

Figure 2:
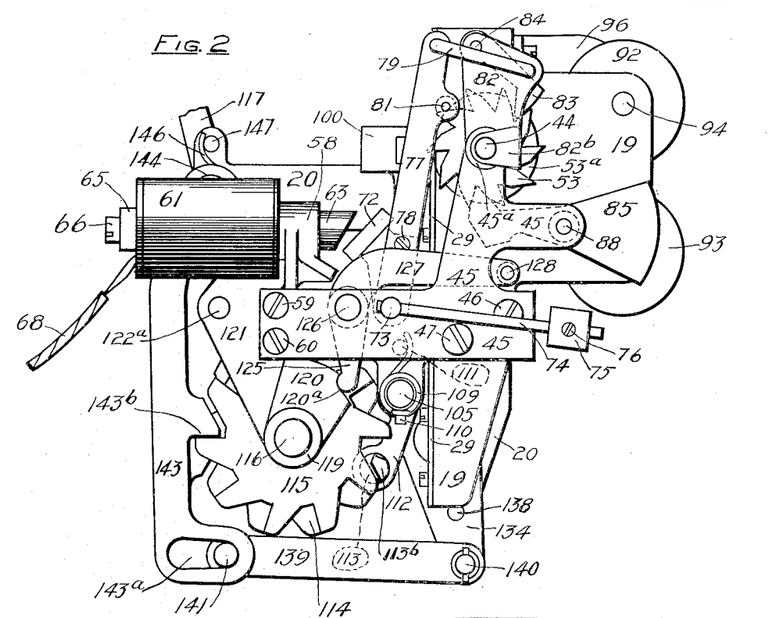
Fig. 2 is a side view in elevation with the top plate and casing removed, the same being taken on the reverse side from the view shown in Fig. 1.
Figures 3, 6, 11:
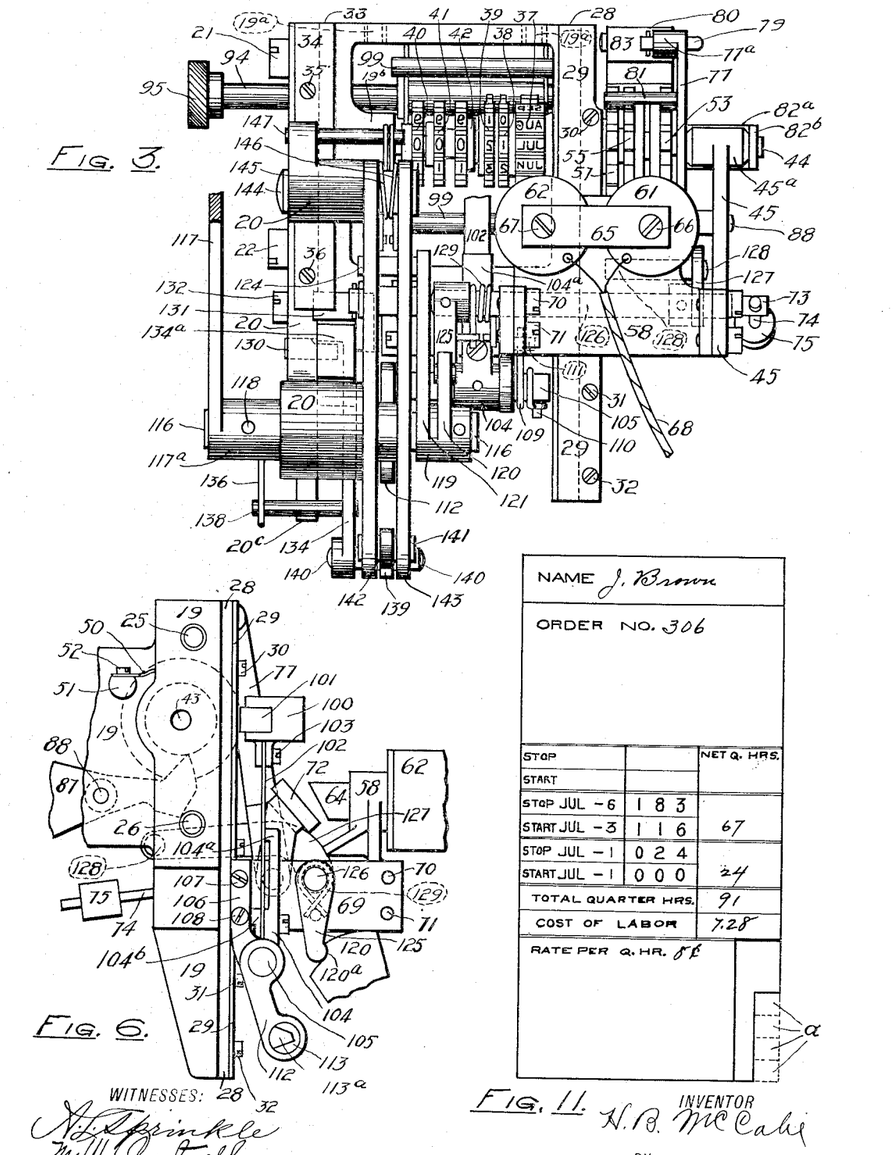
Fig. 3 is a rear view in elevation of the device with the top plate and casing removed, and also having the ribbon removed and the impression hammer broken away to expose the type wheels.
Fig. 6 is a view in elevation of the mechanism looking from the same side as in Fig. 1, but having the casing and the mechanism shown in Fig. 4 removed, and certain other parts, as will be apparent, broken away to better disclose the interior mechanism.
Fig. 11 is a face view of a record card or other object adapted for use in the machine. On the face of the card appears the time recording impressions and also the figures by which the cost of the labor indicated is calculated.
Figures 4, 5:
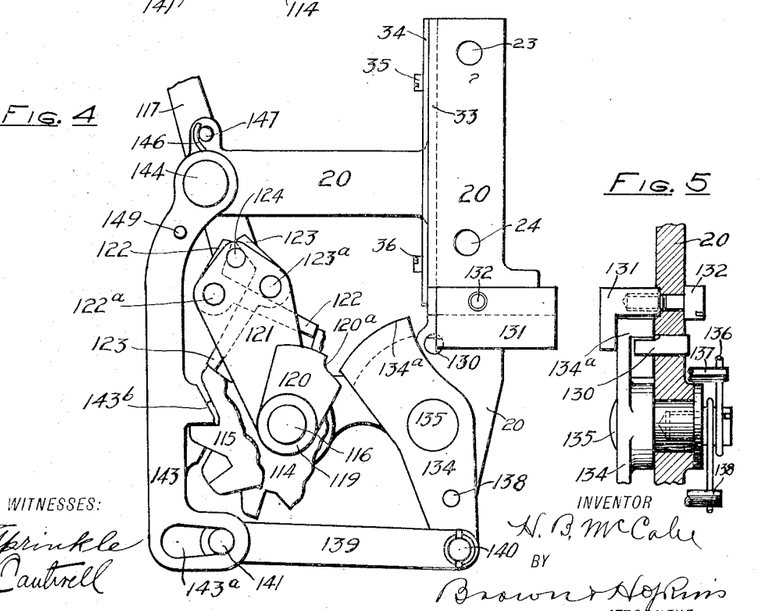
Fig. 4 is a view in side elevation of a portion of the main frame with the mechanism carried thereby, the same being shown removed from the assembled machine, looking from the interior toward the outside thereof.
Fig. 5 is a broken detail view showing the card positioning or cutting mechanism and adjacent parts, the supporting frame member being shown in section.

The card or object on which the time record is to be printed or stamped is preferably of the form illustrated in Fig. 11. The slot through which the card is inserted into the printing mechanism may be seen in dotted lines in Fig. 1 in top plate 10, and is indicated by the numeral 27. This slot registers with corresponding guide ways formed on the upright branches of frame members 19, 20. The guide way or groove on the member 19 is indicated by the numeral 28, and is formed thereon by securing to the member 19 a flange plate 29, cap screws 30, 31 and 32 being employed for this purpose. It will be seen that the member 19 has formed in its face a recessed portion over which the elongated plate 29 projects, thus forming the groove or guide way 28. A corresponding groove 33 for the opposite edge of the card is formed on the upright branch of the frame member 20 by the use of the elongated flanged plate 34, which is secured to member 20 by cap screws 35, 36. The plate 34 projecting beyond the inner face of the upright branch of frame member 20 forms one face of groove or guide way 33, the face of the corresponding upright branch of frame member 19 which takes the position shown by dotted lines in Fig. 4 forming the other side of the said groove. The type wheels, carrying on their peripheries the desired characters for printing or stamping the time record, are mounted to rotate in the frame member 19 in order to present their character surfaces adjacent the surface of the card when inserted in the machine through the slot 27, and in the guide ways 28, 33, just described. These comprise the type wheel 37, carrying on its periphery the names of the calendar months from January to December respectively; the type wheels 38 and 39, adapted to coöperate with the type wheel 37 and carrying on their peripheries the numerals 0 to 9 respectively, the wheel 39 serving as the units wheel, and 38 the 10's wheel, to indicate the days of the month; also the type wheels 40, 41 and 42, each of which have the numeral characters 0 to 9 respectively on their peripheries, the type wheel 40 serving as units wheel, 41 as 10's wheel, and 42 as 100's wheel. All of these type wheels are mounted to rotate on a common axis, the main frame 19 being provided with an inwardly projecting branch 19ᵇ and a suitable aperture 43 adapted to take one end of shaft 44. This shaft 44 extends through an opening through an adjacent leg of frame member 19, which appears in broken section in Fig. 7, and is journaled in an upright supporting member 45, which is secured to the main frame 19 by cap screws 46 and 47, as shown in Fig. 2.

Figures 7, 8, 10:
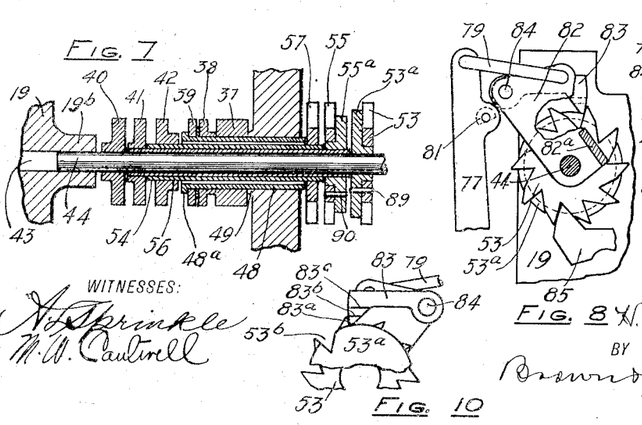
Fig. 7 is a vertical section taken through the center of the type and ratchet wheels, the view looking toward the left as these parts appear in Fig. 1.
Fig. 8 is a detail view of the type ratchets, their operating pawl, and adjacent mechanism taken in the position in which the parts appear in Fig. 2, but with pawl in operative position.
Fig. 10 is a detached view of the outer ratchet wheel and the actuating pawl as these parts appear looking toward the left in Fig. 9.

From the detailed construction of the type wheels and their associated mechanism appearing in Fig. 7, it will be seen that the type wheels 37, 38 and 39 for indicating the months and the days thereof are journaled on a sleeve 48 secured to the adjacent branch of the frame 19, and are held in position to rotate on this sleeve by reason of the flange 48ª on its outer end, which bears against type wheel 39. There is also a flange or collar 49 formed on frame member 19 around the sleeve 48 to furnish an end bearing for the type wheel 37. The type wheels 37, 38 and 39 may be set in any desired manner in order that they may stamp or print the months and the days thereof on the card or other object correctly. In the present embodiment of the invention these are designed to rotate independently of each other on sleeve 48, and may be set by hand or by the use of a small instrument or stick brought into contact with their peripheries. The characters on these type wheels appear in the well-known manner on spaced portions of the periphery, and have depressions between them. They may be kept from turning after being adjusted by means of suitable flat springs bearing against their peripheries and adapted to coöperate with the said depressions therein. A form of such spring is illustrated in Fig. 1, as indicated by the reference character 50, which is secured to a lug or pin 51 on the frame by screw 52. The time indicating type wheels 40, 41 and 42 are carried on shaft 44. In order that the ratchets operating the type wheels may be made larger in diameter than the type wheels themselves and may otherwise be of substantial size and occupy more space longitudinally than would be allowable at the sides of the type wheels and thus be in a more advantageous position to be operated without the corresponding use of small, delicate pawls, etc., they are placed in a position removed from the type wheels, as will be apparent from an inspection of the parts shown in Fig. 7 and in Fig. 3. These time indicating type wheels 40, 41 and 42 are designed to be electrically operated or set at suitable intervals, from a master clock. In order that they may be thus operated it is desirable that there be as little friction as possible, and it is for this reason that the day and month indicating type wheels 37, 38 and 39 are mounted to rotate on a sleeve 48, while type wheels 40, 41 and 42 are carried by shaft 44, there being sufficient space around the exterior of outer sleeve on shaft 44 to allow it to rotate entirely free of the sleeve 48, as will be apparent from an inspection of the view of these parts shown in Fig. 7. Type wheel 40 is securely fixed in any desired manner, as by a suitable pin or otherwise, not here shown, to rotating shaft or arbor 44. Its corresponding ratchet wheel 53 is also securely fixed to shaft 44, so that when ratchet wheel 53 is moved, type wheel 40 through shaft 44 will be rotated.

Type wheel 41 is fixed to one end of the sleeve 54, which is loosely mounted on shaft 44, and at its other end it carries ratchet wheel 55, which is fixed thereto, so that when it is rotated, type wheel 41 through the sleeve 54 will be correspondingly rotated. Likewise type wheel 42 is fixed to one end of sleeve 56, to the other end of which is fixed ratchet wheel 57. The plate 45 in which the ratchet wheel end of shaft 44 is journaled has been already referred to, and its contour may be seen in Fig. 2. This plate at its lower side is provided with an angular branch, to which the supporting frame 58 of an electric magnet is attached by suitable screws 59, 60. This electric magnet is of the common form, comprising coils 61, 62, through the interior of which extend cores 63, 64, these cores passing through the supporting member 58 at their forward ends and being connected at the rear by a yoke 65 and retaining screws 66 and 67. 68 indicates the usual electrical connections of the magnet with the primary or controlling clock, which is equipped with mechanism adapted to close the circuit at predetermined intervals and thus energize the poles 63, 64 of the magnet.

By referring to Fig. 6, it will be seen that the frame 58 supporting the mechanism, which is secured at one side to the plate 45, as already described, is also supported at its inner side by a plate 69 to which it is attached by suitable screws 70 and 71. The plate 69, like plate 45, is also secured to the main frame 19. Coöperating with the poles 63, 64 of the magnet is the armature 72. This armature is pivoted on arbor or shaft 73, one end of which is journaled in plate 45 and extending beyond the exterior of said plate. At its outer end shaft 73 is provided with a longitudinally extending arm 74, on which is adjustably mounted a weight 75 provided with a set screw 76. The inner end of shaft 73 extends into plate 69, into which it is journaled. Armature 72 is of sufficient width to contact with poles 63 and 64 of the magnet at the same time. An arm 77 extends upwardly from the pivoted armature 72, and may be integral therewith or fixed thereto, as shown in Fig. 2, by being journaled over shaft 73 and secured to armature 72 by screw 78. The arm 77 carries a link 79 at its upper extremity, being pivotally secured thereto in the enlarged portion 77ª, and secured by pin 80. Near the upper extremity of arm 77 is an enlargement on the forward side thereof into which a laterally extending pin 81 is secured. This pin is preferably flattened on one side, and is adapted to contact with the teeth on ratchet wheels 53, 55 and 57 when the arm 77 is in the position shown in Fig. 2. A rocking member 82 is pivotally mounted on shaft 44, which is also the axis about which the ratchet wheels 53, 55 and 57 rotate. This rocking member 82 carries actuating pawl 83, which is pivotally secured to it by pin 84. In order to furnish a secure means for mounting the rocking member 82, a laterally extending branch 82ª is formed integrally therewith and terminates in an angular lip 82ᵇ journaled over the outer end of shaft 44. Thus the branches 82ª and 82ᵇ form a supporting yoke for the rocking member 82, the space within the yoke being utilized by the enlarged portion 45ª at the upper extremity of the plate 45, into which the shaft 44 is journaled, as already described. When the poles of the electro-magnet are energized by the closing of the circuit, the armature 72 will close by rocking toward the poles on its pivot 73. This movement will also rock the arm 77, and through link 79 and rocking member 82, the pawl 83, into the position in which all these parts are shown in Fig. 8. As soon as the electric circuit is broken and the armature consequently released, the weight 75 on arm 74 will rock shaft 73 and consequently advance the pawl 83 forward until the pin 81 contacts with the teeth on the ratchet wheels as illustrated in Fig. 2. It will now be seen that the function of pin 81 is to prevent further forward movement of the ratchet wheels when their actuating pawl has reached the limit of its forward movement, a result which is very desirable in pawl actuated ratchet wheels of this character, in order to insure absolute accuracy and to prevent the wheels from overrunning. In order to prevent these ratchet wheels from having a retrograde movement, particularly when the actuating pawl 83 is being withdrawn by the energizing of the magnet, gravity pawls 85, 86, 87 coöperating with ratchet wheels 53, 55 and 57 are provided. These pawls are all mounted on a common pivot pin 88, secured at one end to a laterally extending branch on the plate 45 (see Fig. 2), and at its other end secured in main frame 19. It will be noted from the construction of these pawls that their pointed ends engaging with the teeth of the ratchet wheels contain less material than the opposite ends which lie on the other side of the point of their pivotal connection with pin 88, and thus gravity, acting on these excessively weighted ends, holds them in operative relation to their associated ratchet wheels. Since ratchet wheels 53, 55 and 57 control type wheels 40, 41 and 42 respectively, which are the units, tens and hundreds wheels, in the order named, it will be apparent that provision must be made by which the actuating pawl 83 will operate ratchet wheel 53 at each reciprocation, but at the same time will engage ratchet wheel 55 only once during each complete revolution of ratchet wheel 53, and will engage the hundreds ratchet wheel 57 only once during every complete revolution of the tens ratchet wheel 55, and consequently only once for every ten complete revolutions of the ratchet wheel 53, it being understood, of course, that there are ten ratchet teeth on each of the said ratchet wheels, corresponding to the ten spaced characters on each of the type wheels 40, 41 and 42. This is accomplished by securing the flanges 53ª and 55ª to the sides of the units and tens ratchet wheels 53 and 55 respectively. These flanges may be cast or formed integrally on the sides of the ratchet wheels 53 and 55, or may, as in the embodiment shown (see Fig. 7) consist of separate circular wheels to which the ratchet wheels 53 and 55 are secured, as by pins 89 and 90.

Figure 9:
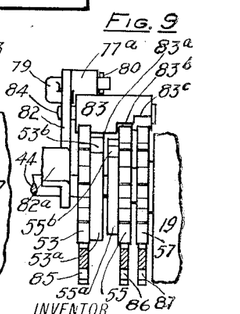
Fig. 9 is a side view of the parts appearing in Fig. 8.

In the construction shown in the drawings, it will be noted that the parts 53ª and 55ª are attached directly to rotating shaft 44 and to the sleeve 54. The actuating pawl 83 is provided with three engaging surfaces 83ª, 83ᵇ and 83ᶜ, adapted to engage with the teeth on ratchet wheels 53, 55 and 57 respectively. The engaging surface 83ª extends lowest on the pawl and is designed to engage the ratchet teeth on the units ratchet wheel 53, and it will be seen that it will therefore engage the teeth of the units wheel at each reciprocation of the pawl, the laterally extending surface 83ª engaging the outer periphery of the flange member 53ª and thus holding the pawl in the position shown in the detail drawing in Fig. 9 entirely out of engagement with the ratchet teeth on the tens and hundreds ratchet wheels 55 and 57. The periphery of the flange 53ª, however, is provided with a notch 53ᵇ (see Figs. 9 and 10) which registers in depth with the depth of the notch between the teeth on ratchet wheel 53. By this construction it will be seen that when the pawl 83 reaches the engaging side of the tooth adjacent this notch 53ᵇ it will drop therein until the laterally extending surface 83ª comes in contact with the peripheral surface of the flange 55ª. This drop of the pawl 83 will permit the engaging surface 83ᵇ on the pawl to engage with the tooth on ratchet wheel 55, so that this ratchet wheel will be rotated one tooth during that reciprocation of the pawl, or, in other words, by this construction ratchet wheel 55 will be rotated one tooth or space for every ten similar movements imparted to ratchet wheel 53, or once during each complete revolution of ratchet wheel 53. But when pawl 83 drops into notch 53ᵇ of the units ratchet wheel, the engaging surface 83ᶜ thereon will not yet reach the ratchet teeth on the hundreds ratchet wheel 57 so long as the engaging surface 83ª on the pawl can drop no lower than the periphery of the flange 55ª on ratchet wheel 55. The flange 55ª, however, is provided with a notched depression 55ᵇ, so that when this notch registers with the notch 53ᵇ, the engaging surface 83ª of the pawl may drop to the bottom of the depression between the teeth on the units pawl, which correspond to the depth of the depressions 53ᵇ and 55ᵇ in flanges on the units and tens wheels. This downward movement of the pawl into the notch 55ᵇ on the tens wheel will bring the engaging surface 83ᶜ·in contact with the teeth on the hundreds ratchet wheel, so that once during each one hundred reciprocations of the pawl, the hundreds wheel will be operated one tooth or space. By this construction it will be seen that the units ratchet wheel will advance one tooth for every movement of the pawl, the tens ratchet wheel will advance one tooth every tenth movement of the pawl, and the hundreds ratchet wheel will advance one tooth every one hundredth movement of the pawl, the movements of the pawl corresponding, of course, to the closing of the circuit and the consequent energizing of the magnet which closes the armature, thus bringing the pawl into the position shown in Fig. 8, being in position to operate the register mechanism as soon as the armature is released by reason of gravity acting on the weight 75 on arm 74, as described.

In order that the type wheels 37, 38, 39, 40, 41 and 42 may be utilized to print the record impressions on the card or other object inserted in the machine, a suitable printing ribbon indicated by the reference character 91 (Fig. 1) is provided and is carried on suitable spools 92, 93. One of these spools, preferably the upper one 92, is in the embodiment shown secured on shaft 94, journaled to rotate in the main frame. The ribbon may be operated in any desired or suitable manner and one means for accomplishing this end comprises a shaft 94, which is designed to project beyond the outer casing, as illustrated in Fig. 3, and is provided with a suitable button or knob 95. The shaft 94 is journaled at its inner end into the rearwardly projecting portion on main frame 19, and is supported at its outer end by an arm 96, also secured to the main frame. Spool 93 is journaled on pin 97, secured at its inner end to member 19 and provided at its outer end with a cross-retaining pin 98. In order that the ribbon may be brought into proper relation over the surface of the type wheels, guides 99 are provided. These may be either in the form of pins or rollers. One of these guide members is located above and the other below the surface of the type wheels adapted to contact with the card or other object to be printed or stamped.

From an inspection of the position of the parts, including the ribbon just described, as they appear in Fig. 1, it will be observed that when the card or other object is inserted in the slot to receive the impression from the type wheels, the ribbon 91 will be interposed between the card and the type on the said wheels. A hammer adapted to strike the card or other object to receive the impression and to force the same in contact with the type wheels is provided, same being indicated by the reference character 100, the striking face of which is provided with a member 101 of rubber or other elastic substance adapted to bring the card into contact with any slight irregularities in the type surface of the wheels to insure a perfect impression. This hammer 100 is preferably secured to an elastic upright arm 102, as by the depending branches thereon, which take the screw 103. The lower end of the arm 102 is secured to a rocking member 104 which is provided with an upwardly extending branch 104ᵃ adapted to contact with the arm 102 to prevent undue vibratory motion. The member 104 is mounted on shaft 105, which is carried on a suitable bracket 106 secured to the main frame by screws 107, 108 (see Fig. 6). The inner end of the shaft 105 (see Fig. 2) is provided with a coil spring 109, one end of which is secured thereto by pin 110, and the other end of the spring bearing against a suitable pin or lug 111 on the main frame. In this manner the hammer is held closely in contact with the type wheels, or approximately so, until withdrawn by rocking the shaft 105 against the action of the spring 111, which is accomplished at each reciprocation of the operating handle in the manner to be hereinafter described. The shaft 105 is provided with a downwardly extending arm 112 rigidly secured thereto, the lower end of the same being provided with a cross-pin 113, the ends of which project on each side of the member 112 and are provided with reduced portions or surfaces 113ᵃ and 113ᵇ, suitably shaped to coöperate with teeth on a pair of ratchet wheels 114, 115, which are loosely journaled on shaft 116, which also carries main operating handle 117. 117ᵃ is the hub of the handle or crank 117, which is secured to shaft 116 by pin 118. Shaft 116 is journaled in a branch of the main frame portion 20 at the lower side thereof and carries at its inner end a hub portion 119 to which are secured arms 120 and 121, both of which are adapted to be rocked by the rocking of the lever or handle 117, which, as will be seen from Figs. 1 and 3, is operable from the exterior of the casing. Arm 121 carries the pawls 122, 123, secured thereto by pins 122ᵃ and 123ᵃ, the pawl 122 being adapted to coöperate with the teeth on ratchet wheel 114 and the pawl 123 likewise to engage teeth on ratchet wheel 115. It will be seen that ratchet wheels 114, 115, while similar in construction, are in reverse position on shaft 116 with respect to the position of their teeth, and by being thus mounted on the shaft, they are adapted to be rotated in reverse directions by the rocking of lever or handle 117. The pin 124 with which pawls 122 and 123 engage is adapted to prevent them from dropping too low into the depressions between the teeth on their respective ratchet wheels. It will be seen that the depending arm 112 is located between ratchet wheels 114 and 115, and that cross-pin 113 projecting on each side thereof, is adapted to contact with the teeth of both wheels, the end 113$^a$, by reason of the manner in which it is beveled, being adapted to coöperate with the teeth on ratchet wheel 114, while the shape of the end 113$^b$ adapts it to coöperate with the teeth on wheel 115. It will be seen that as the lever or handle 117 is rocked in either direction, a turn will be given to one of the ratchet wheels 114, 115, and that whichever of these wheels is rotated, one tooth or space of movement thereof will rock the depending arm 112, and its shaft 105 against the action of spring 109. When the ratchet tooth passes beyond the cross-pin 113 and releases it, the hammer 100 is impelled in the direction of the type surfaces and striking the card or other object, an impression will be recorded. A stop or lug 104$^b$ upon locking member 104 strikes the frame, thus limiting the forward rotation of shaft 105 under the action of its operating spring 109.

Arm 120 which is rocked by the rotation of collar 119 with shaft 116 is provided with a depression 120$^a$ at its upper end coöperating with the lower extremity of the arm 125 on shaft 126, to which is secured arm 127 carrying a pin 128 at its forward end. The rocking of handle 117 in one direction will, through cam or arm 120, arm 125 and shaft 126, cause arm 127 to lift pin 128 into contact with the engaging ends of gravity pawls 85, 86 and 87, thus causing these pawls to lock their associated ratchets 53, 55 and 57. A coil spring 129 (see Figs. 3 and 6) is provided on shaft 126 to cause the same to be held normally in position, so that pin 128 will not be in contact with gravity pawls 85, 86 and 87, so as to lock them except when cam 120 operates the mechanism against the action of this spring. The purpose of this mechanism just described for locking the ratchet wheels is to prevent the pawl and its associated mechanism when operated by the armature from operating the time indicating wheels during the interval from the time that a workman has stamped his card indicating the time of stopping a job until he has stamped another card indicating the time of starting on another job.

At the bottom of slot 33 in frame member 20 a pin 130 is inserted which serves as a stop to limit the downward movement of the card when inserted in the machine to be printed or stamped. Adjacent this stop pin is a die 131 adjustably secured to frame member 20 by a suitable cap screw 132 which passes through elongated slot 133 in frame 20.

134 is a cutter pivoted to frame 20 at 135. The upper end of this cutter is provided with cutting member 134$^a$ coöperating with die 131 adapted to notch the lower right hand corner of the card as shown in Fig. 11, the notched portions being indicated by the reference letter $a$. The coil spring 136 is adapted to control cutter 134 and has one of its ends in contact with pin 137 on frame member 20, the other end thereof being in contact with pin 138 on the cutter. This spring holds the cutter normally away from the die in the position in which the parts are shown in the drawings, particularly in Fig. 1, the pin 138 striking a projecting lug 20$^c$ on the frame. Link 139 is pivotally connected to the cutter by pivot pin 140, and at its other end carries a cross-pin 141 extending on each side and entering slots 142$^a$ and 143$^a$ in members 142 and 143, both of which are pivoted at their upper extremities on pin or trunnion 144, secured in main frame 20.

Members 142 and 143 are provided with lugs 142$^b$ and 143$^b$ which are engaged by the ratchet teeth on ratchet wheels 114 and 115 respectively. Members 142 and 143 are normally held in engagement with their respective ratchet wheels by the coil springs 145 and 146 which surround the pivot pin 144 and have one of their free ends engaging pin 147 on frame member 20 and their other ends engaging suitable pins as 148 and 149 on members 142 and 143.

The operation of the device is as follows: A card or other object, on which the time record is to be printed or stamped, is inserted into the machine through slot 27 in the upper cover plate. This card is preferably of the form illustrated in Fig. 11 and it is lowered along slots 28 and 33 past the type wheels until the lower right hand corner, which at the time of the recording of the first impression has not been cut away, comes in contact with stop pin 130. Lever 117, at the time of the insertion of the card, is in the position shown in Fig. 1, it being in contact with stop pin 150 which is secured on the exterior of the casing. When the card is in position as described, lever 117 is then pulled to its forward position until it comes in contact with stop pin 151, which is also arranged on the exterior of the casing to limit its movement in its forward position. This movement of the lever causes ratchet wheel 114 to operate member 142 and the cutter 134, which, entering die 131 cuts a notch, as the lower notch indicated by the reference character $a$ on the card illustrated in Fig. 11. As soon as the lever 117 reaches its stop pin 151, lug 142ᵇ on member 142 will have been released and will be returned to normal position by its operating spring 145. This will free the cutter, which, under the action of its spring 136, will resume its original position.

During the operation of cutting the notch from the card, the rotation of ratchet wheel 114 will have operated depending arm 112 and thereby the hammer 100, thus making the desired impression on the card. At the same time the rocking of arm or cam 120 through its associated mechanism will have raised pin 128 on arm 127 to bear against the bottom surfaces of pawls 85, 86 and 87, thereby locking the ratchets operating the type wheels against movement until released by the return of the operating lever 117 to its original position in contact with stop pin 150. The card is then removed and the impression which has been recorded or stamped thereon will indicate the date, that is, the month and the day of the month, and will also indicate the total number of periods of time that have elapsed during working hours since the mechanism was started at zero. It will be apparent that the periods of time may be of any desired length but it is preferred that quarter hours be used as illustrated by the card shown in Fig. 11. On the card shown in the illustration it may be assumed that the mechanism was set in motion at zero at the beginning of working hours on the morning of July the first, the workman using this card starting on order No. 306 at that time. The stamping of this card, July 1st, with zero quarter hours opposite the word "start" will be the first operation on the card, which would at the same time cut out the lower notch a as described. The mechanism, of course, could be returned to normal to release the ratchet wheels by printing and stamping another workman's card in the same manner, and during the return of the mechanism the following movement of the parts would take place: Ratchet wheel 115 would be rotated in the opposite direction from the rotation previously given to ratchet wheel 114. This would operate member 143 and the cutter 134 as before. The teeth of ratchet wheel 115 contacting with cross pin 113ᵇ on arm 112 would operate the hammer as before, and the return of cam or arm 120 would cause arm 127 and pin 128 carried thereby to drop, thus releasing the gravity pawls controlling the type wheel ratchets.

In the normal use of the device, it is intended that a workman shall stamp his card each time that he starts and each time that he stops a job. Therefore on quitting work on a particular job it will ordinarily be necessary for him to stamp two cards, that is, stamp the time of stopping on one card and the time of starting on the other card. By inspecting the form of card shown in the illustration it will be seen that the same indicates that the workman began work on order No. 306 at the beginning of working hours on the morning of July 1st; the work on that order proceeded until twenty-four quarter-hours had elapsed on that day. Work on the same order was again resumed on July 3rd, one hundred and sixteen quarter-hours having elapsed since the mechanism was started. The work on the order this time continued throughout all working hours until the one-hundred-and-eighty-third period, which was July the 6th. By subtracting the quarter hours recorded, it will be seen that the work proceeded the last time uninterruptedly for sixty-seven quarter hours, making a total of ninety-one quarter hours. The rate of the workman may be indicated on the card as shown, which in this case is eight cents per quarter hour, the total cost of labor on the job being computed at $7.28. The cutting away of the squares or notches a at the lower right hand corner of the card will cause the card to register one space lower in the mechanism at each insertion, thus printing each new record just above the previous one.

The reason for providing the locking pin 128 for controlling the type wheels will be apparent since it is desirable in stamping two cards, one on stopping the job and the other on starting a new one, that the mechanism shall show the same time on each of them and if it were not for this locking mechanism the energizing of the magnet from the master clock might operate the type wheels between the time that a workman stamped his record of stopping on one job and the record of starting on another. With this form of locking device, should the magnet become energized the closing of the armature would move arm 77 and operating pawl 83 to a position in readiness to act upon the type wheel ratchets. The gravity pawls 85, 86 and 87, however, being locked, the weight 75 on arm 74 would be held in suspended position until the pawls were released, when the desired movement would then be given the type wheels, thus causing them to record the periods of time correctly.

As already indicated the mechanism is to be electrically connected in the usual manner, as by the wires indicated at 68, Fig. 3, with a master clock. It will be apparent, however, that only lapses or periods of time during working hours should be recorded and it is desirable that a switch or other suitable means be provided for connecting and breaking the circuit at the beginning and at the closing of working hours.

In order that the invention might be fully understood the details of an embodiment thereof have been thus specifically described but

What I claim is:

1. In a device of the character described, the combination with time controlled recording mechanism, of a main frame, a pivoted operating lever secured thereto, a pair of rotatable ratchet wheels adapted to be operated by the movement of the said lever on its pivotal connection with the said frame, one of the said ratchet wheels being adapted to be moved by the forward movement of the lever and the other by the reverse movement thereof, and suitable connections with the said ratchet wheels whereby the movements of each of said wheels operates mechanism adapted to take an impression from said time controlled recording mechanism.

2. In a device of the character described, the combination with printing mechanism, of time controlled means for operating said printing mechanism at predetermined intervals, means for producing a printed impression from said printing mechanism, and means whereby said printing mechanism is locked from movement by the time controlled means immediately before one impression is produced, and is held locked until after the succeeding impression is produced.

3. In a device of the character described, the combination with type wheels operable from a master clock, of mechanism for producing a printed impression from said type wheels, a hand actuated lever, and means connected therewith whereby each of the movements of the lever in opposite directions will operate the said printing mechanism, and locking means connected with the said lever whereby the type wheels are locked during the movement of the lever in one direction and are held in locked position until near the completion of the movement of the lever in the opposite direction.

4. In a device of the character described, the combination of a plurality of rotatable type wheels, of time controlled means for operating the said wheels at predetermined intervals, mechanism adapted to take a printed impression from said type wheels, a pivotally mounted hand-actuated lever adapted to operate said printing mechanism during the movement of the said hand-actuated lever in each direction, and means operable from the said hand lever whereby the said type wheels are locked from movement during the movement of the said hand operated lever in one direction after the taking of an impression and are released when the said lever reaches substantially the end of its movement in the opposite direction and after the taking of a succeeding impression.

5. In a device of the character described, the combination in a plurality of type printing wheels of a date wheel rotatably mounted on a hollow stationary sleeve, a numbering wheel mounted on a rotatable shaft passing through said hollow sleeve but held out of contact therewith, and means for operating the said rotatable shaft.

6. In a device of the character described, the combination with time controlled recording mechanism, of a main frame, a pivoted operating lever secured thereto, a pair of rotatable ratchet wheels adapted to be operated by the movement of the said lever on its pivotal connections with the said frame, one of the said ratchet wheels adapted to be moved by the forward movement of the lever and the other by the reverse movement thereof, mechanism adapted to take an impression from the said recording mechanism, a cutter, and connections between said mechanism and the said ratchet wheels whereby the movement of each of said wheels will operate the impression mechanism and the cutter whereby the position of the card or other object adapted to receive an impression from the recording mechanism is secured.

7. In a device of the character described, the combination with time controlled recording mechanism, of an operating lever and means connected therewith and operated thereby to take an impression from the said recording mechanism, and to alter or change the shape of an object being printed or stamped to adapt the same for a succeeding insertion in the machine, and means whereby the time controlled recording mechanism may be locked against change during the period intervening between the taking of one impression and the taking of a succeeding impression.

8. In a device of the character described, the combination with a plurality of rotatable type wheels, of time controlled means for operating said wheels at predetermined intervals, mechanism for producing the printed impression from said wheels, and means whereby said wheels are locked from movement by the time controlled means immediately before one impression is produced and are held locked until after a succeeding impression is produced.

9. In a device of the character described, the combination of a plurality of type wheels, a corresponding number of ratchet wheels for actuating the same, said ratchet wheels being located in the same axial line with said type wheels but separated therefrom and connected therewith by telescoping shafts, and a date wheel interposed between the ratchet wheels and the type wheels and mounted to rotate co-axially therewith on a stationary hollow sleeve, said hollow sleeve being supported independently of said telescoping shafts supporting the type wheels and their ratchets.

10. A device of the class described including in combination rotatable type wheels, time controlled mechanism for operating said wheels at predetermined intervals, mechanism for producing printed impressions from said wheels, and means for preventing said time controlled means from operating said wheels during the period of time between the taking of two consecutive impressions from said wheels.

11. In a device of the character described, the combination of one or more rotatable type wheels, a toothed operating wheel coöperating with each of the type wheels for moving the latter, a reciprocating member engaging said wheels, time controlled mechanism for moving said member in one direction, means for locking said wheels after the said movement, said means being adapted to permit the member to move in the opposite direction, and means for imparting movement to the member in the said opposite direction.

12. In a device of the character described, the combination with time controlled printing mechanism, of spring actuated means for taking an impression from said printing mechanism, and positively actuated means operated independently of said spring-actuated means for cutting away a portion of the edge of the card so that it may be correctly positioned to receive a second impression.

In testimony whereof I have signed my name to this specification, in the presence of two subscribing witnesses, on this 2nd day of October, A. D. 1907.

HORACE B. McCABE.

Witnesses:
 CHARLES H. SEEM,
 A. L. SPRINKLE.